ial is required for this purpose. Various materials may be used for forming a film on a metallic surface, such as cellulose acetate, nitrocellulose and the mixed esters, such as cellulose acetate butyrate. However, to form a film using extrusion means on a thin metallic member, involves problems which are neither readily apparent nor easily solved. Many of these materials easily form air bubbles which are difficult to eliminate due to the extreme viscosity of the paste. The use of a single solvent or of certain solvent mixtures resulting in drying characteristics could not be used with rigid coating extrusion equipment, and in some cases, the coating reticulates and cures too slowly. A satisfactory coating composition for use with high speed coating, requires that the extrusion paste adhere to the metal and dry rapidly leaving a glossy, smooth film coating.

United States Patent Office 2,771,638
Patented Nov. 27, 1956

2,771,638
HIGH SPEED EXTRUSION COMPOSITION

Martin Salo and Oliver W. Kaul, Rochester, N. Y., assignors to Eastman Kodak Company, Rochester, N. Y., a corporation of New Jersey No Drawing. Application March 2, 1954,
Serial No. 413,714

4 Claims. (Cl. 18—59)

This invention concerns cellulose acetate butyrate paste coating compositions and more particularly compositions suitable for high speed extrusion at room temperature.

In the past, compositions made from nitrate film scrap have been used for extrusion coating on metallic members. However, due to a substitution by the motion picture industry, for the most part, to cellulose triacetate film base the supply of satisfactory nitrate film scrap has been reduced. Consequently, a new film forming material is required for this purpose. Various materials may be used for forming a film on a metallic surface, such as cellulose acetate, nitrocellulose and the mixed esters, such as cellulose acetate butyrate. However, to form a film using extrusion means on a thin metallic member, involves problems which are neither readily apparent nor easily solved. Many of these materials easily form air bubbles which are difficult to eliminate due to the extreme viscosity of the paste. The use of a single solvent or of certain solvent mixtures resulting in drying characteristics could not be used with rigid coating extrusion equipment, and in some cases, the coating reticulates and cures too slowly. A satisfactory coating composition for use with high speed coating, requires that the extrusion paste adhere to the metal and dry rapidly leaving a glossy, smooth film coating.

We have discovered that a composition suitable for high speed extrusion onto metallic members can be made from cellulose acetate butyrate. These metallic members may be made of steel, iron, copper, brass, nickel plated steel and other common metals. The composition encases the metal and contracts on drying to form a bond around the member which is elastic enough to withstand considerable bending. For instance, these formulations may be extruded onto metal strips, filaments or webs. One application is a coating on steel webs used for corset stays.

An object of this invention is to provide a cellulose acetate butyrate coating composition suitable for high speed extrusion onto metallic members. Another object of this invention is to provide a high speed coating paste having a solvent mixture which results in a fast drying film. A further object of this invention is to provide an evaporative-gel type coating system which may be used at high speeds.

The above objects are obtained by careful formulation of cellulose acetate butyrate with a ternary solvent mixture comprising toluene, acetone and hexane. We have discovered that the solvents selected are extremely critical and include the above three solvents within definite limits. The solvent mixture contains at least 50% toluene, 10–40% acetone and from 10–30% hexane by weight. The following formula has been found suitable:

| | Percent by weight |
|---|---|
| Cellulose acetate butyrate, 37% butyryl content | 38.36 |
| Dibutyl phthalate | 2.32 |
| White pigment grind [1] | 12.75 |
| Toluene | 33.00 |
| Acetone | 8.06 |
| Hexane | 5.51 |

[1] The following were ball milled to make the white pigment grind: 30.7% titanox, 66.2% acetone, 3.1% AB–381–20.

A plasticizer such as dibutyl phthalate may be included as well as a pigment such as titanium dioxide or the like. The specific solvent mixture was 60:30:10 by weight toluene, acetone, and hexane. The cellulose acetate butyrate should be in the form of air free fused chips or granules which can be made by milling the ester on heated compounding rolls followed by granulation of the fused material.

The paste was made by mixing the components at room temperature in a W and P mixer. These mixtures were coated on metal web material, and formed an evaporative-gel type system even at high speeds. Accordingly, a fairly rigid, uniform gel structure was obtained in a few moments after extrusion permitting nearly immediate passage of the coated web over the guide rolls in the curing section without damaging the coating in any manner.

Cellulose acetate butyrate coatings are made using a cellulose acetate butyrate having a butyryl content of above about 35% and an acetyl content of above about 10%.

These coatings may be used in coating thin metal members useful in applications where a smooth, glossy coating is desired. A particular application is to metallic members where flexibility is desired in the coating.

We claim:
1. A paste coating composition comprising cellulose acetate butyrate admixed with a ternary solvent mixture comprising at least 50% toluene, 10%–30% hexane and at least 10% acetone.

2. A cellulose acetate butyrate coating composition suitable for high speed extrusion comprising cellulose acetate butyrate having a butyryl content of above about 35%, and a ternary solvent mixture comprising at least 50% toluene, 10%–30% hexane and at least 10% acetone.

3. A process for high speed extrusion coating comprising dissolving cellulose acetate butyrate in a ternary solvent mixture of at least 50% toluene, 10%–30% hexane and at least 10% acetone, and extruding onto a metal web.

4. A process for high speed extrusion comprising dissolving cellulose acetate butyrate granules having about 37% butyryl content in a ternary solvent mixture comprising at least 50% toluene, 10%–30% hexane and at least 10% acetone, extruding the mixture onto a metal strip, at room temperature and curing.

References Cited in the file of this patent

UNITED STATES PATENTS

| 1,501,764 | Flint | July 15, 1924 |
| 2,100,425 | Bent et al. | Nov. 30, 1937 |
| 2,218,385 | Schulze | Oct. 15, 1940 |
| 2,524,829 | Perzel | Oct. 10, 1950 |
| 2,570,490 | Saums | Oct. 9, 1951 |
| 2,602,756 | Huchs | July 8, 1952 |
| 2,605,328 | Pintell | July 29, 1952 |